(12) United States Patent
Zhou et al.

(10) Patent No.: US 11,280,699 B2
(45) Date of Patent: Mar. 22, 2022

(54) FLAKING DEVELOPMENT ANALYSIS METHOD AND FLAKING DEVELOPMENT ANALYSIS DEVICE FOR RACEWAY RING OF ROLLING BEARING

(71) Applicant: NSK LTD., Tokyo (JP)

(72) Inventors: Kang Zhou, Fujisawa (JP); Taketoshi Chifu, Fujisawa (JP); Hiroki Mizokuchi, Fujisawa (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 17/426,375

(22) PCT Filed: Feb. 19, 2020

(86) PCT No.: PCT/JP2020/006622
§ 371 (c)(1),
(2) Date: Jul. 28, 2021

(87) PCT Pub. No.: WO2020/171142
PCT Pub. Date: Aug. 27, 2020

(65) Prior Publication Data
US 2022/0042879 A1 Feb. 10, 2022

(30) Foreign Application Priority Data
Feb. 19, 2019 (JP) .............................. JP2019-027618

(51) Int. Cl.
*G01M 13/04* (2019.01)
*G01M 13/045* (2019.01)

(52) U.S. Cl.
CPC .......... *G01M 13/045* (2013.01); *G01M 13/04* (2013.01)

(58) Field of Classification Search
CPC ............................ G01M 13/04; G01M 13/045
See application file for complete search history.

(56) References Cited

U.S. PATENT DOCUMENTS

2002/0121141 A1* 9/2002 Kiuchi .................. F16C 33/585
73/593
2006/0210206 A1* 9/2006 Ihata .................... F16H 57/0469
384/446

(Continued)

FOREIGN PATENT DOCUMENTS

JP 5-1985 A 1/1993
JP 2014-20778 A 2/2014

(Continued)

OTHER PUBLICATIONS

Hashimoto et al., "Effect of small defect on the flaking strength of rolling bearings (Part 22: Evaluation of the flaking strength of rolling bearing having a small drilled hole based on stress intensity factor)" The Japan Society of Mechanical Engineers, Jul. 4, 2017, (12 pages).

(Continued)

*Primary Examiner* — Eric S. McCall
(74) *Attorney, Agent, or Firm* — Sughrue Mion, PLLC (57) ABSTRACT

A flaking development analysis method and a flaking development analysis device for a raceway ring of a rolling bearing which make it possible to, after fine flaking occurs, predict a relationship between an elapsed time and a shape of a flaked portion based on a development speed of the flaking, and perform bearing replacement at an appropriate timing.

6 Claims, 11 Drawing Sheets

(56) References Cited

U.S. PATENT DOCUMENTS

| | | | |
|---|---|---|---|
| 2006/0210207 A1* | 9/2006 | Umeda | F16C 33/6622 384/490 |
| 2008/0075399 A1* | 3/2008 | Shibasaki | G01L 5/0023 384/448 |
| 2011/0224917 A1 | 9/2011 | Uluyol et al. | |
| 2012/0239716 A1* | 9/2012 | Murray | G06F 15/025 708/160 |
| 2015/0168254 A1 | 6/2015 | Ito et al. | |
| 2017/0328408 A1* | 11/2017 | Hosseini | F16C 33/34 |
| 2021/0255060 A1* | 8/2021 | Maekawa | G01L 5/0019 |

FOREIGN PATENT DOCUMENTS

| | | |
|---|---|---|
| JP | 2017-26445 A | 2/2017 |
| JP | 2017-219469 A | 12/2017 |
| WO | 2020/040280 A1 | 2/2020 |

OTHER PUBLICATIONS

Toumi et al., "Numerical simulation and experimental comparison of flaw evolution on a bearing raceway: Case of thrust ball bearing," Journal of Computational Design and Engineering 3, Jan. 27, 2018, (8 pages).

Chifu et al., "Analysis Prediction Technique of Flaking Expansion in Roller Bearings for Wind turbines," NSK Technical Journal No. 691, Jan. 21, 2019, (10 total pages).

International Search Report (PCT/ISA/210) dated Mar. 31, 2020 issued by the International Searching Authority in International Application No. PCT/JP2020/006622.

Written Opinion (PCT/ISA/237) dated Mar. 31, 2020 issued by the International Searching Authority in International Application No. PCT/JP2020/006622.

Written Opinion (PCT/ISA/237) dated Mar. 31, 2020, issued by the International Searching Authority in English counterpart International Application No. PCT/JP2020/006622.

* cited by examiner

FLAKING DEVELOPMENT ANALYSIS METHOD AND FLAKING DEVELOPMENT ANALYSIS DEVICE FOR RACEWAY RING OF ROLLING BEARING

This application is a National Stage of International Application No. PCT/JP2020/006622 filed on Feb. 19, 2020 claiming priority from JP Application No. 2019-027618 filed on Feb. 19, 2019, the disclosures of which are incorporated herein in their entirety by reference.

TECHNICAL FIELD

The present invention relates to a flaking development analysis method and flaking development analysis device for a raceway ring of a rolling bearing, and more particularly, to a flaking development analysis method and flaking development analysis device for a raceway ring of a rolling bearing used in a wind power generation device, a mining equipment including a transportation vehicle, a steel equipment such as a rolling mill, and the like.

BACKGROUND ART

When the rolling bearing is rotated while receiving a load, since raceway surfaces of an inner ring and an outer ring and a rolling surface of a rolling element are constantly repeatedly subjected to the load, scaly fine damage called flaking may appear due to material fatigue. In general, a lifetime of a bearing is defined as a time until the bearing cannot be used due to the flaking. However, in a case of a large bearing such as a bearing for a wind power generation device, it is not easy to replace the bearing, and it takes a lot of time to procure replacement parts and actually replace the parts even if flaking occurs in the bearing. Therefore, working may be continued after taking measures such as limiting power generation output before the parts are replaced. However, in a case that the flaking progresses rapidly due to a delay in a replacement time, a large amount of flaked pieces may be caught in a gear or the inner and outer rings may crack, and in a worst case, a maintenance operation of stopping the device over a long period of time may be required.

Therefore, during a periodic inspection, it is necessary to determine whether normal working or working with limited output can be performed up to a next inspection, or at which time the bearing needs to be replaced. As such a determination method, for example, Patent Literature 1 discloses a state monitoring device including: a filter processing unit configured to divide a waveform detected by a vibration sensor into a plurality of damage filter frequency bands and extracts the damage filter frequency bands; an arithmetic processing unit configured to obtain spectral data based on the filtered waveform; a precision diagnosis unit configured to identify an abnormal part of a rolling bearing by comparing a bearing damage frequency calculated based on a rotational speed of the rolling bearing with the spectral data obtained by the arithmetic processing unit; a damage level diagnosis unit configured to diagnose a degree of damage at the abnormal part based on an effective vibration value calculated based on each damage filter frequency band; and a remaining lifetime prediction unit configured to predict a remaining lifetime of the abnormal part based on the abnormal part, the degree of damage at the abnormal part, and a working environment of the rotating part, and the state monitoring device predicts a remaining lifetime of the abnormal part.

Further, in a state monitoring device for a rolling bearing described in Patent Literature 2, a displacement sensor that detects a relative displacement in a radial direction between inner and outer rings of a rolling bearing is provided, and when the detected relative displacement between the inner and outer rings exceeds a preset threshold value, it is determined that abnormality occurs in the rolling bearing. The threshold value is set based on a reference displacement, which is a relative displacement between the inner and outer rings in a case where a rolling element passing through a center of a load region of the rolling bearing is not subjected to a load and remaining rolling elements passing through the load region are subjected to the load. In particular, a bearing replacement time is determined by comparing the detected relative displacement with the threshold value set in consideration of a fact that when damage is enlarged in a circumferential direction of the raceway surface up to an extent that two adjacent rolling elements simultaneously pass through a damaged portion, a rolling element load increases due to decrease in the number of rolling elements which receive the load, and a development speed of the damage increases.

CITATION LIST

Patent Literature

Patent Literature 1: JP-A-2017-219469
Patent Literature 2: JP-A-2017-26445

SUMMARY OF INVENTION

Technical Problem

In Patent Literature 1, prediction of the remaining lifetime of the rolling bearing is described, but when the prediction is applied to an actually operating machine (in particular, a case in which the rolling bearing is continuously used even if flaking occurs), the following problem occurs.

1. When initial flaking that occurs on the raceway surface is enlarged in the circumferential direction, the load cannot be received due to a gap between the rolling element and the inner and outer rings when the rolling element passes through the flaked portion. Therefore, with respect to an ideal rolling element load distribution in which all the rolling elements in a load zone receive the load, the number of rolling elements supporting the load decreases, and the rolling element load in a vicinity of the rolling element passing through the flaking increases. However, in Patent Literature 1, since an increase in the rolling element load is not considered, rapid enlargement of the flaking cannot be predicted.

2. In a case that prediction of the remaining lifetime, in order to calculate a stress intensity factor range $\Delta K$ used in an expression of a crack development speed, a specific shape of a calculation target is generally required. However, since there is no description of a shape of the flaking, the lifetime prediction accuracy is low.

Further, Patent Literature 2 describes a method of setting a threshold value for clarifying a bearing replacement time, but the method is not to predict development of the flaking, the remaining lifetime until replacement cannot be predicted, and a replacement bearing cannot be arranged preliminary.

The present invention has been made in view of the above-described problems, and an object of the present invention is to provide a flaking development analysis method and flaking development analysis device for a raceway ring of a rolling bearing which make it possible to, after fine flaking occurs, calculate a development speed of flaking, predict a relationship between an elapsed time and a shape of a flaked portion, and perform bearing replacement at an appropriate timing.

Solution to Problem

The above object of the present invention is achieved by the following configurations.

(1) A flaking development analysis method for predicting development of flaking of a raceway ring of a rolling bearing which is to be used in a rotation machine and includes inner and outer raceway rings and rolling elements between the two raceway rings, comprises the steps of:

acquiring presence or absence and a shape of flaking of the raceway ring by a flaking state acquisition unit;

calculating, based on at least the acquired shape of the flaked portion, a specification of the rolling bearing, and a working condition of the rolling bearing, a rolling element load acting on a rolling element when the rolling element passes through an exit portion of the flaked portion of the raceway ring;

calculating, based on the rolling element load at the exit portion of the flaked portion, a development speed of the flaking in which a shape of the in-progress flaked portion is taken into consideration; and calculating a relationship between an elapsed time and a shape of the flaked portion based on the development speed of the flaking.

(2) A flaking development analysis device for predicting development of flaking of a raceway ring of a rolling bearing which is to be used in a rotation machine and includes inner and outer raceway rings and rolling elements between the two raceway rings, comprises:

a flaking state acquisition unit configured to acquire presence or absence and a shape of flaking of the raceway ring; and an arithmetic unit configured to:
calculate, based on at least the acquired shape of the flaked portion, a specification of the rolling bearing, and a working condition of the rolling bearing, a rolling element load acting on a rolling element when the rolling element passes through an exit portion of the flaked portion of the raceway ring,
calculate, based on the rolling element load at the exit portion of the flaked portion, a development speed of the flaking in which a shape of the in-progress flaked portion is taken into consideration, and
calculate a relationship between an elapsed time and a shape of the flaked portion based on the development speed of the flaking.

Advantageous Effects of Invention

According to the flaking development analysis method for a raceway ring and the flaking development analysis device for a raceway ring of the present invention, since the development speed of the flaking in which the shape of the in-progress flaked portion is taken into consideration is calculated based on the rolling element load which acts when the rolling element passes through the exit portion of the flaked portion on the raceway ring, and the relationship between the elapsed time and the shape of the flaked portion is predicted, the bearing replacement can be performed at an appropriate timing.

DESCRIPTION OF EMBODIMENTS

Hereinafter, a flaking development analysis method and flaking development analysis device for a raceway ring of a rolling bearing according to an embodiment of the present invention will be described in detail with reference to the drawings.

Figure 1:
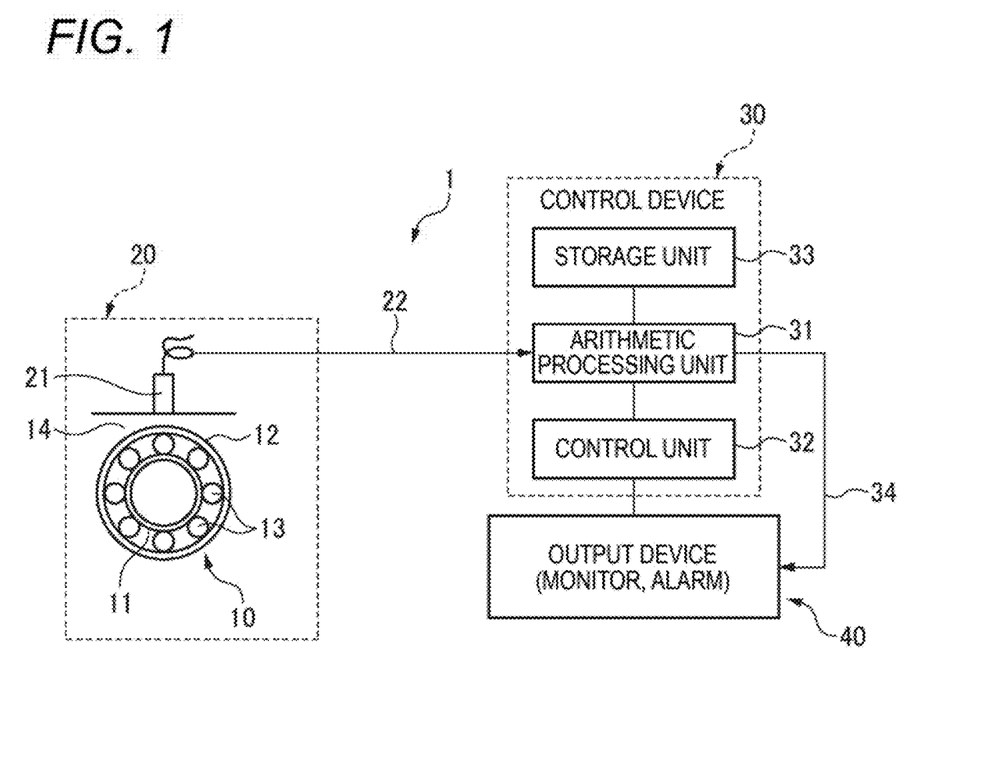
FIG. 1 is a block diagram showing a schematic configuration of a flaking development analysis device for a raceway ring according to an embodiment of the present invention.
Figure 2A:
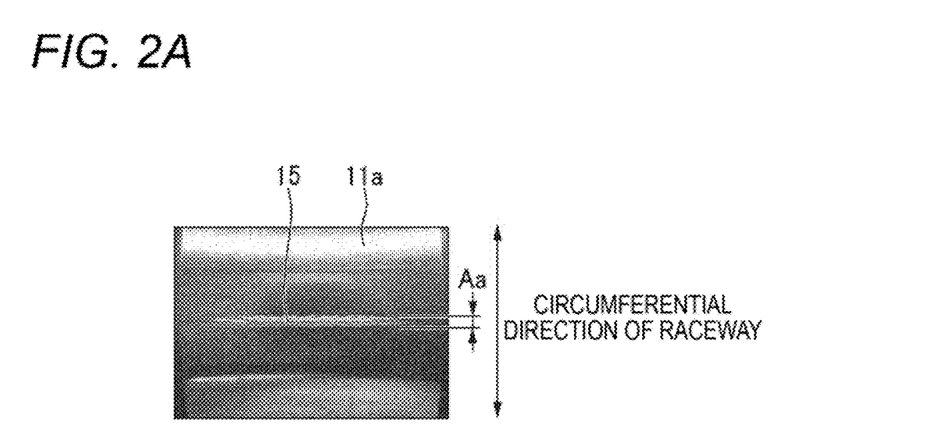
FIG. 2A is an image showing an example of a development state of flaking on an inner ring of a cylindrical roller bearing.
Figure 2B:
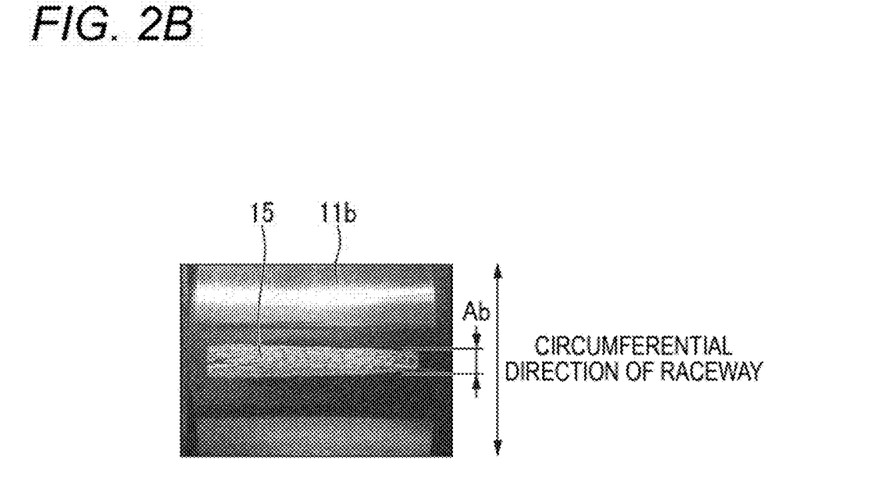
FIG. 2B is an image showing an example of a development state of the flaking on the inner ring of the cylindrical roller bearing.
Figure 2C:
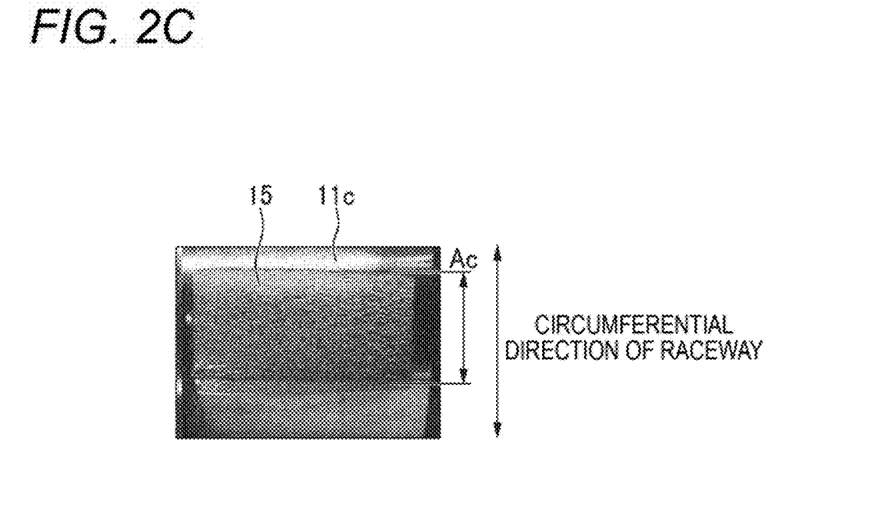
FIG. 2C is an image showing an example of a development state of the flaking on the inner ring of the cylindrical roller bearing.
Figure 2D:
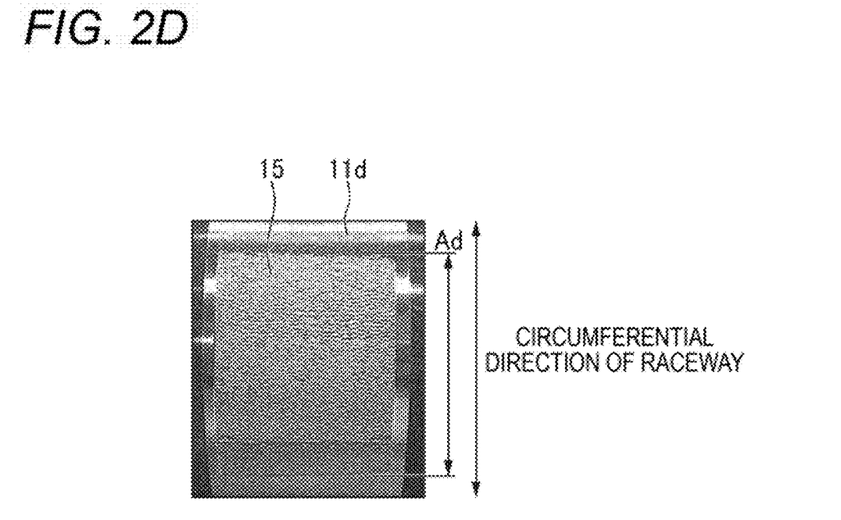
FIG. 2D is an image showing an example of a development state of the flaking on the inner ring of the cylindrical roller bearing.

As shown in FIG. 1, a flaking development analysis device 1 for a raceway ring of the present embodiment analyzes a flaked portion generated in a raceway ring (that is, an inner ring 11 or an outer ring 12) of a rolling bearing 10 incorporated in a mechanical equipment 20. The flaking development analysis device 1 includes a flaking state acquisition unit 21 which acquires presence or absence and a shape of flaking of the rolling bearing 10, a control device 30 including an arithmetic processing unit 31 which receives signal acquired by the flaking state acquisition unit 21 via a data transmission unit 22, and processes the signal so as to perform an analysis on presence or absence of flaking of the raceway ring of the rolling bearing 10 and development of the flaking, a control unit 32 which drives and controls the mechanical equipment 20, and a storage unit 33 which stores an analysis result and the like, and an output device 40 which is implemented by a monitor, an alarm, and the like, and outputs a flaking development analysis result and a remaining lifetime of the rolling bearing 10.

The rolling bearing 10 includes the inner ring 11 externally fitted to a rotation shaft of the mechanical equipment 20, the outer ring 12 internally fitted to a housing 14 and the like, a plurality of rolling elements 13 disposed so as to be able to roll between the inner ring 11 and the outer ring 12, and a retainer (not shown) holding the rolling elements 13 so as to be able to roll freely.

In the present embodiment, a roller bearing is assumed in which the rolling element 13 is in line-contact with raceway surfaces of the inner ring 11 and the outer ring 12, and as shown in FIGS. 2A to 2D, development ($11a \rightarrow 11b \rightarrow 11c \rightarrow 11d$) of flaking of the inner ring 11 can be approximated in one dimension as a change ($Aa \rightarrow Ab \rightarrow Ac \rightarrow Ad$) in a circumferential length A, and a case in which the flaking occurs on the raceway surface of the inner ring 11 will be described as an example.

As the flaking state acquisition unit 21, a certain one is selected according to a method of acquiring the flaking state. For example, the flaking state acquisition unit 21 may be set as a fiber scope or a camera so as to directly observe a shape of the flaked portion. Alternatively, in a case of a method of detecting a length of a flaked portion described in Japanese Patent Application No. 2018-156535, which has been devised by the present applicant, the flaking state acquisition unit 21 may be a vibration sensor or a load sensor, and in a case of a method of detecting a flaking length described in Patent Literature 2, the flaking state acquisition unit 21 may be a displacement sensor. Further, the flaking state acquisition unit 21 may detect a temperature, an amount (concentration) of iron powder in lubricating oil, and the like. The vibration sensor, the load sensor, and the displacement sensor are fixed to a load zone of the housing 14 to which the outer ring 12 as a fixed ring of the rolling bearing 10 is attached.

The control device 30 is configured by a microcomputer (an IC chip, a CPU, an MPU, a DSP, and the like), and executes each process to be described later by a program of the microcomputer.

The control device 30 stores, into the storage unit 33, an analysis result on the flaked portion of the rolling bearing 10 analyzed by the arithmetic processing unit 31, outputs an operation of the mechanical equipment 20 to the control unit 32, and feeds a control signal for driving the mechanical equipment 20 and corresponding to the analysis result back to the operation of the mechanical equipment 20 (a safe working operation such as decreasing a rotation speed). Further, the control device 30 transmits the analysis result to the output device 40 by a data transmission unit 34 using wired or wireless communication in consideration of a network.

The output device 40 displays the analysis result of the rolling bearing 10 on a monitor or the like in real time. Further, when abnormality is detected, an alarm such as a light or a buzzer may be used to alert an operator to pay attention to the abnormality. The data transmission unit 22 of the signal may be wired or wireless in consideration of a network, as long as the data transmission unit 22 can accurately transmit a signal to and receive a signal from the flaking state acquisition unit 21.

Figure 3:
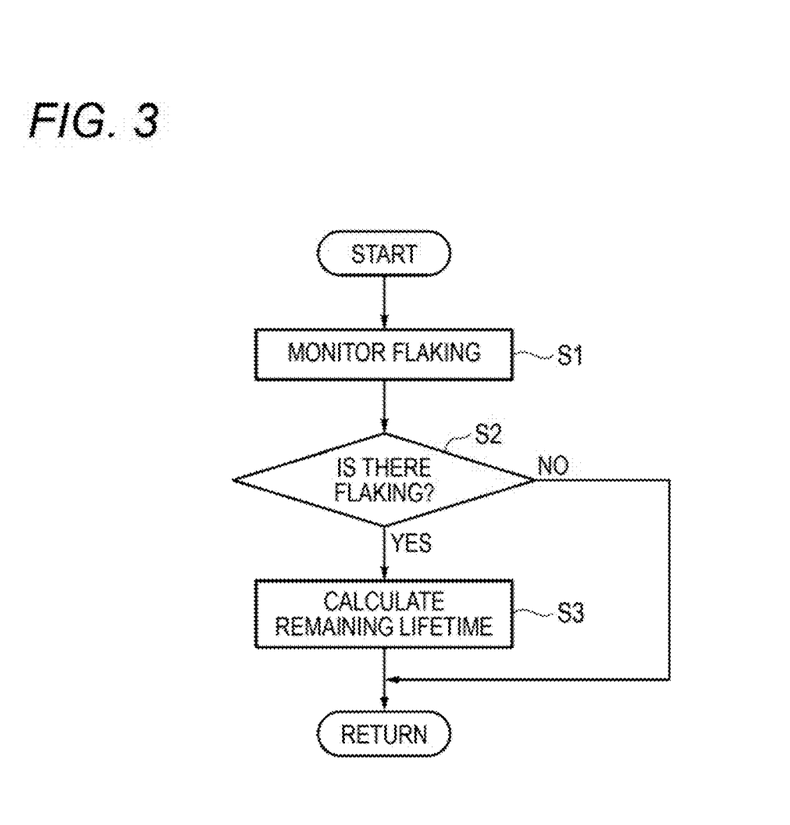
FIG. 3 is a flowchart showing a procedure of a flaking development analysis.

FIG. 3 is a flowchart showing a procedure of a flaking development analysis. First, the presence or absence and the shape of the flaking are acquired by the flaking state acquisition unit 21 (step S1). For example, in a case where the flaking state acquisition unit 21 is a fiberscope, the raceway surface is directly observed. Then, when an initial flaked portion on the raceway surface is observed, in step S2, it is determined that there is flaking, and in the present embodiment, the circumferential length A (see FIGS. 2A to 2D) of the shape of the flaked portion is acquired based on the shape of the observed flaked portion. Then, the process proceeds to remaining lifetime calculation to be described in detail with reference to FIG. 4 (step S3). After the remaining lifetime calculation processing, the process flow ends. On the other hand, when it is determined in step S2 that there is no flaking, the process flow ends. The process shown in FIG. 3 is executed at predetermined time intervals.

Figure 4:
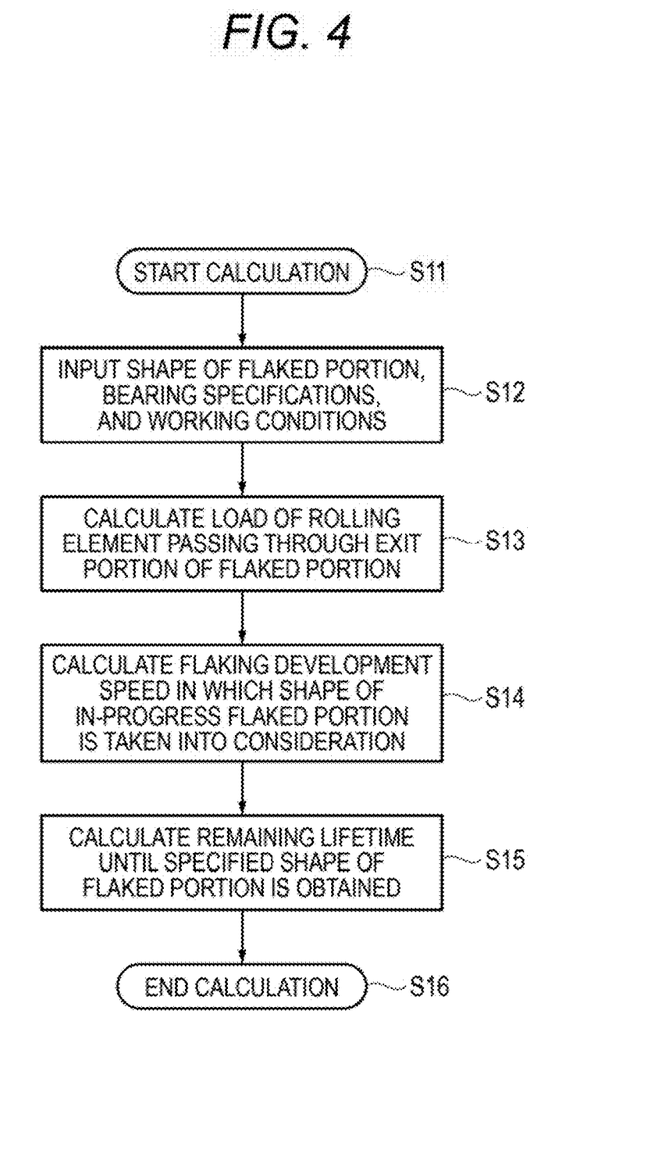
FIG. 4 is a flowchart showing a procedure for calculating a relationship between a working elapsed time of the rolling bearing and a shape of a flaked portion.

FIG. 4 is a flowchart showing a procedure for calculating a relationship between a working elapsed time of the rolling bearing 10 and the shape of the flaked portion, and corresponds to step S3 of FIG. 3. Therefore, when occurrence of a flaked portion 15 is detected in step S2, calculation of this flow is started (step S11), and the shape of the flaking, bearing specifications, and working conditions are input to an arithmetic program (step S12).

As a bearing load which is one of the working conditions, a constant bearing load, a directly measured bearing load, a bearing load indirectly obtained based on power generation output, a rotational torque of a shaft, and the like are input. Further, a working load pattern assumed in advance may be input. As a rotational speed, a current rotational speed may be input on the assumption that the working is continued at the current rotation speed, or a decelerated rotational speed may be input when the working speed is decelerated at a time point when the initial flaked portion is observed.

Next, based on indexes input in step S12 (that is, the initial flaking shape, the bearing specifications, and the working conditions), a rolling element load F of the rolling element 13 passing through an exit portion of the flaked portion, which changes with enlargement of the flaked portion 15, is calculated (step S13). Here, the rolling element load F is calculated by a calculation method according to ISO/TS16281. Since an axial load P presses the inner ring 11 and simultaneously presses the rolling elements 13, the rolling element load F at the exit portion of the flaked portion is calculated by solving a force balance equation.

Figure 5A:
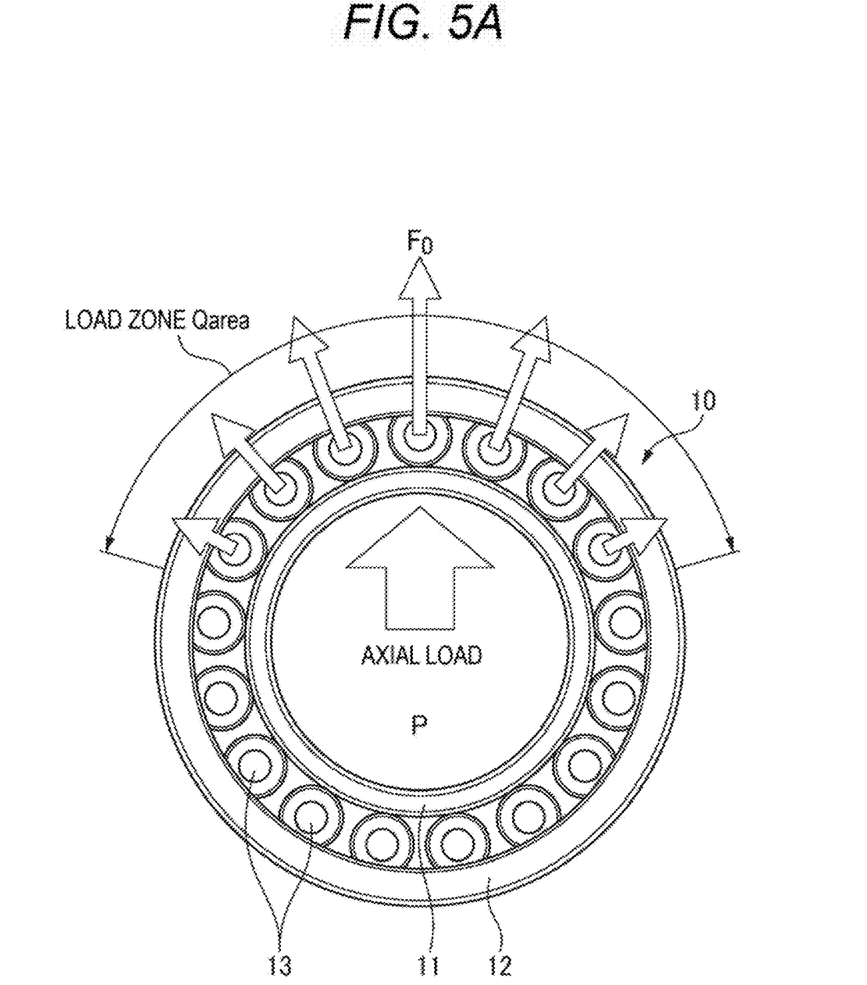
FIG. 5A is a conceptual diagram showing magnitude of a rolling element load before occurrence of flaking.

As shown in FIG. 5A, when the rolling bearing 10 rotates in a state where a radial bearing load is applied to the inner ring 11 due to the axial load P, a rolling element load $F_0$ having magnitude corresponding to a position of the rolling element 13 is generated on each rolling element 13 located in a load zone $Q_{area}$.

Figure 5B:
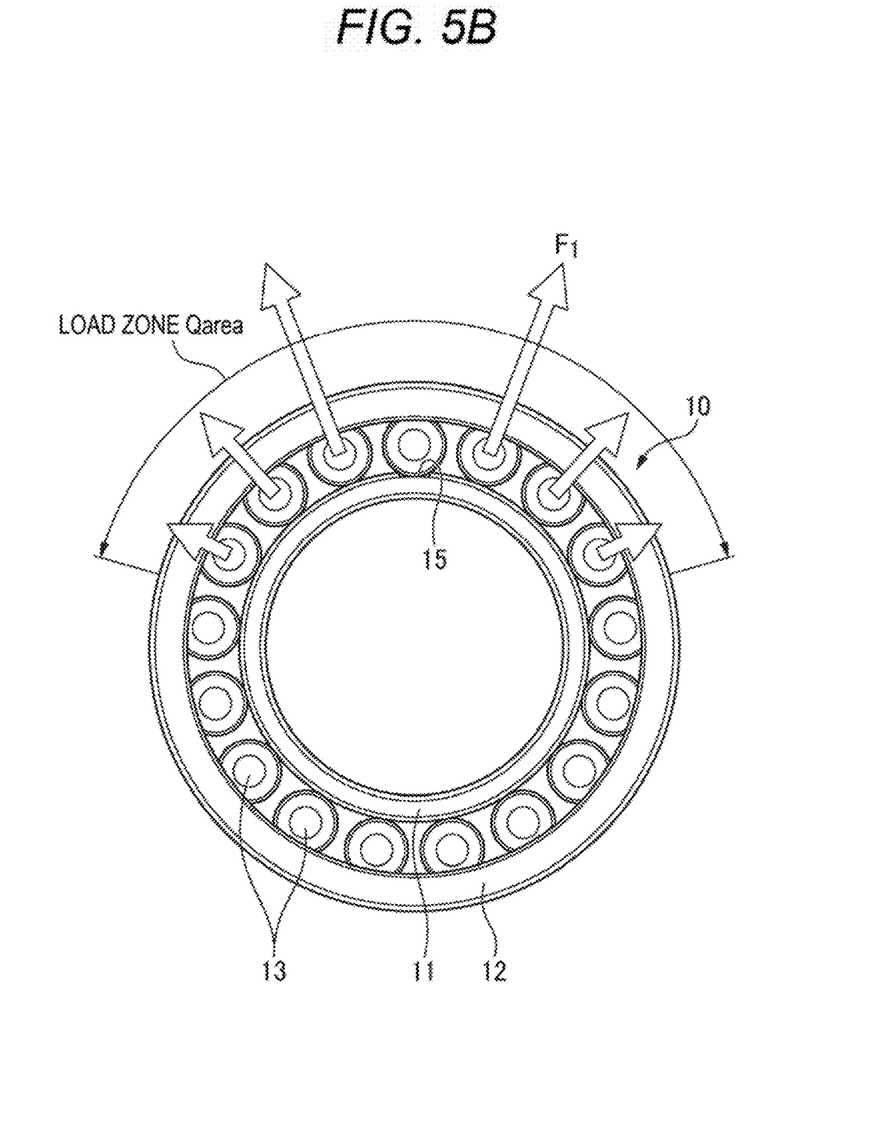
FIG. 5B is a conceptual diagram showing a change in magnitude of the rolling element load after the occurrence of flaking.

Meanwhile, when the flaking occurs on the raceway surface of the inner ring 11 at a center of the load zone $Q_{area}$ where a contact surface pressure between the rolling element 13 and the raceway surface of the inner ring 11 is maximized, as shown in FIG. 5B, the rolling element 13 which is passing through the flaked portion 15 cannot support the bearing load, and the bearing load is supported by a less number of the rolling elements 13 than the rolling elements 13 in the load zone $Q_{area}$ shown in FIG. 5A, so that an increased rolling element load $F_1$ is applied to each of other rolling elements 13 located in the load zone $Q_{area}$. Therefore, by solving the force balance equation in FIG. 5B using a relationship of the rolling element load $F_0$ of each rolling element 13 in FIG. 5A, the rolling element load F at the exit portion of the flaked portion in a state where the initial flaked portion is generated is calculated. Specifically, the rolling element loads $F_0$ and $F_1$ are obtained by a calculation method according to ISO/TS16281. Further, the rolling element load $F_1$ of the rolling element 13 which is passing through the flaked portion 15 is calculated as a load not being received.

Figure 6A:
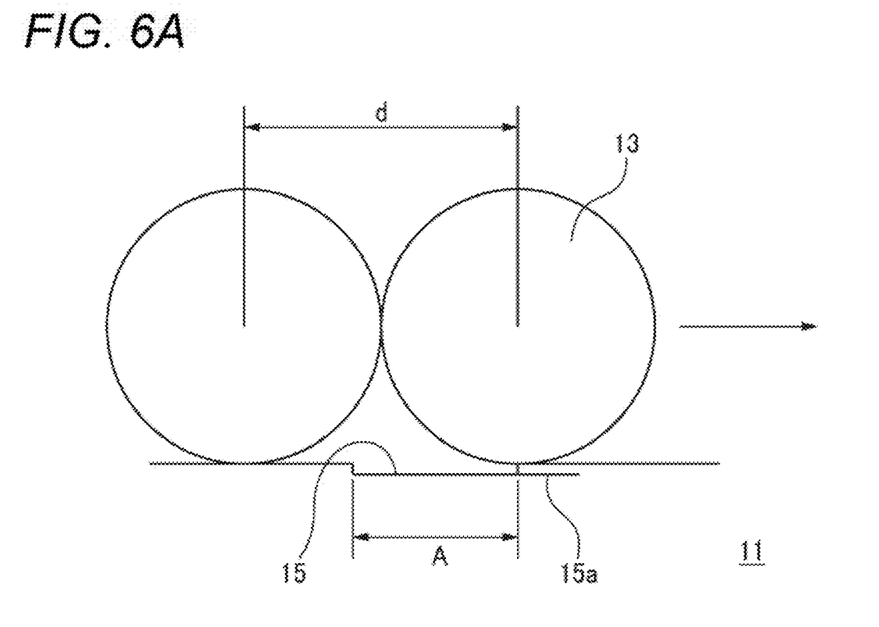
FIG. 6A is an enlarged diagram showing a relationship between a flaked portion and rolling elements.
Figure 6B:
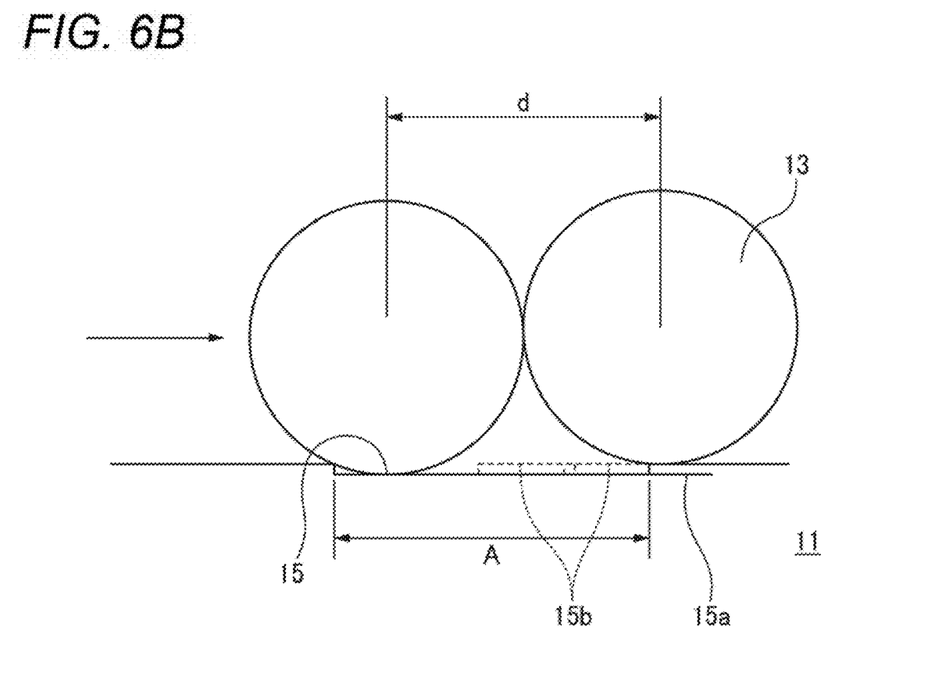
FIG. 6B is an enlarged diagram showing a relationship between the flaked portion and the rolling elements.

Further, the initial flaked portion occurs at the center of the load zone $Q_{area}$ is enlarged in a circumferential direction of the raceway surface (a passing direction of the rolling element 13 in the example shown in the present invention). Normally, a rolling element load is repeatedly applied to a crack 15a (see FIGS. 6A and 6B) at the exit portion of the flaked portion 15, thus the crack 15a gradually develops in the circumferential direction, and thereafter, a flaked piece 15b having a predetermined length is generated in a stepwise manner. Then, as shown in FIG. 6B, when the circumferential length A of the flaked portion 15 is a length in which two adjacent rolling elements 13 enter simultaneously (circumferential length A=distance d between rolling element pitches), the rolling element load $F_1$ at the exit portion of the flaked portion 15 increases and is applied.

Figure 7:
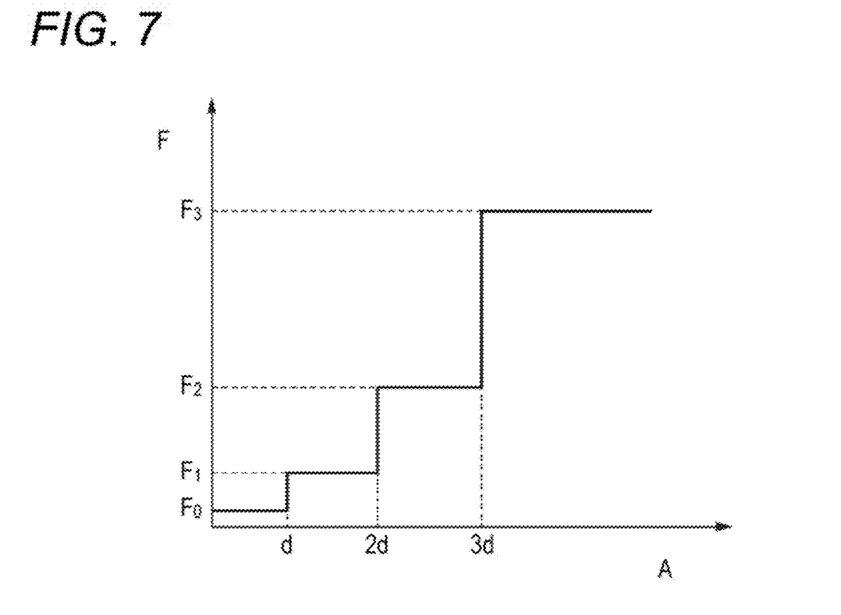
FIG. 7 is a graph showing a relationship between a flaking length and a rolling element load at an exit portion of the flaked portion.

Thereafter, as shown in FIG. 7, the rolling element load F increases stepwise because the number of rolling elements receiving the rolling element load decreases each time the circumferential length A of the flaked portion 15 is the distance d between the rolling element pitches, twice of the distance d, and three times of the distance d. Therefore, a relationship between the rolling element load F at the exit portion of the flaked portion 15 and the circumferential length A of the flaked portion 15 is given.

Then, based on the rolling element load F calculated in step S13, a crack development analysis taking the shape of the in-progress flaked portion into consideration is performed, and a development speed of the crack is calculated as a speed at which the flaked portion 15 is enlarged (flaking development speed V) (step S14).

A crack development behavior in a fatigue phenomenon is dominated by a linear fracture mechanical parameter K (stress intensity factor) represented by a crack length and a stress acting on the crack, and it is known as the Paris law to be described below that in a region where the crack stably develops, a fluctuation range ΔK (stress intensity factor range) of the stress intensity factor K and a crack development amount da/dN per cycle of stress are in a double logarithmic linear relationship.

$$da/dN = C(\Delta K)^m$$

Figure 8A:
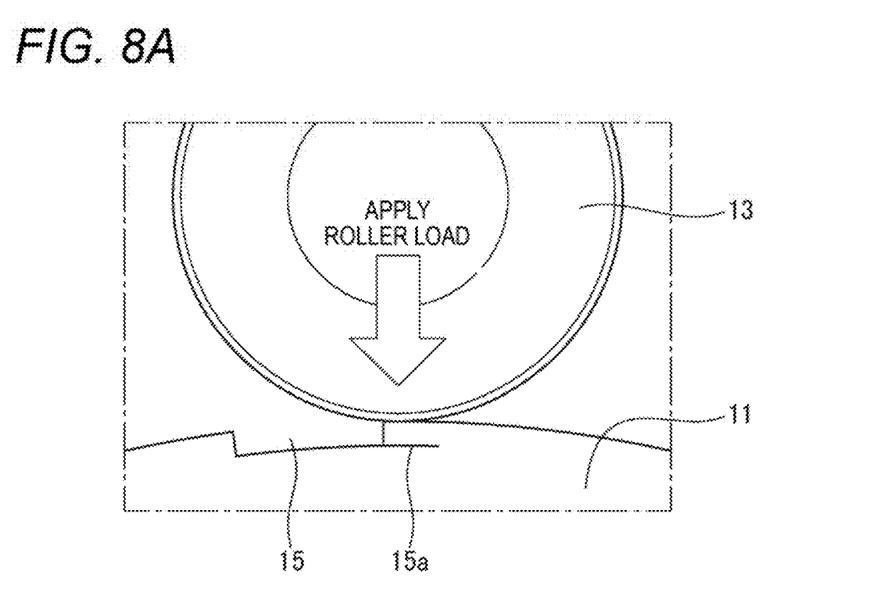
FIG. 8A is a main part-enlarged diagram showing a state in which the rolling element passes through the exit portion of the flaked portion.
Figure 8B:
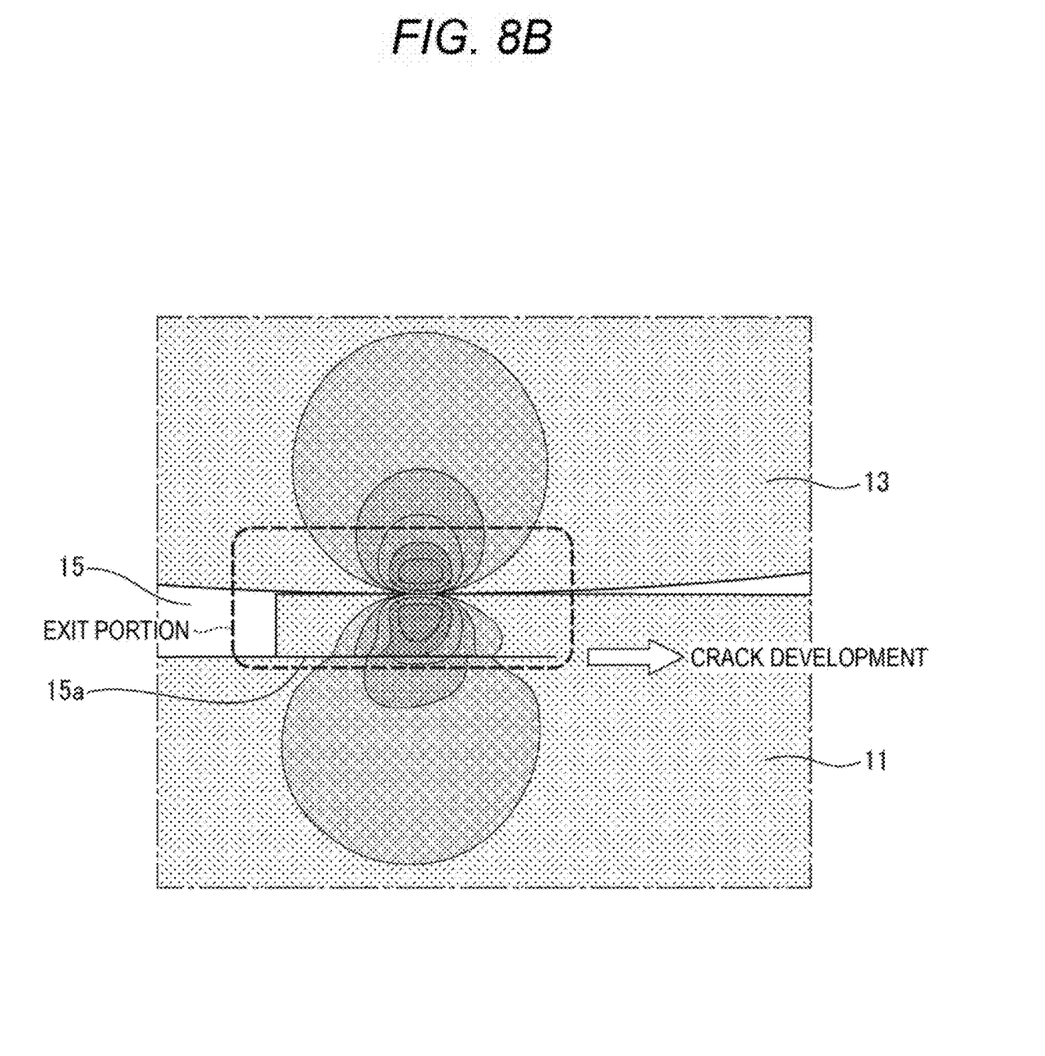
FIG. 8B is a diagram showing a stress distribution at any position which is obtained by an FEM analysis in which a shape of the flaked portion in the state of FIG. 8A is taken into consideration.

C and m are experimental constants and by substituting ΔK into the above equation, the crack development speed can be obtained, as the flaking development speed V, by calculation in the present invention. Specifically, as an example shown in FIGS. 8A and 8B, by a finite element method analysis (FEM analysis) when the rolling element load F calculated in step S13 acts on the rolling bearing, a stress σ acting on the inner ring 11 is calculated at a plurality of positions where the rolling element 13 is moved little by little from an exit end surface of the flaked portion 15 to a vicinity beyond a tip end of the crack (see FIG. 8B), that is, the exit portion of the flaked portion 15, and the stress intensity factor range ΔK is calculated based on fluctuation of the stress σ at the exit portion of the flaked portion 15. In practice, the number of rolling elements which receive the load varies according to rotation of the bearing, but here, a maximum value is input as the rolling element load F. Further, a process of calculating the stress intensity factor range ΔK based on the calculation of the stress σ by the FEM analysis can be formulated, and after the formulation, the calculation using the formula eliminates the necessity for FEM analysis each time.

In the calculation of the flaking development speed (crack development speed) V, a general J integral value in fracture mechanics may be formulated in advance and used.

Figure 9:
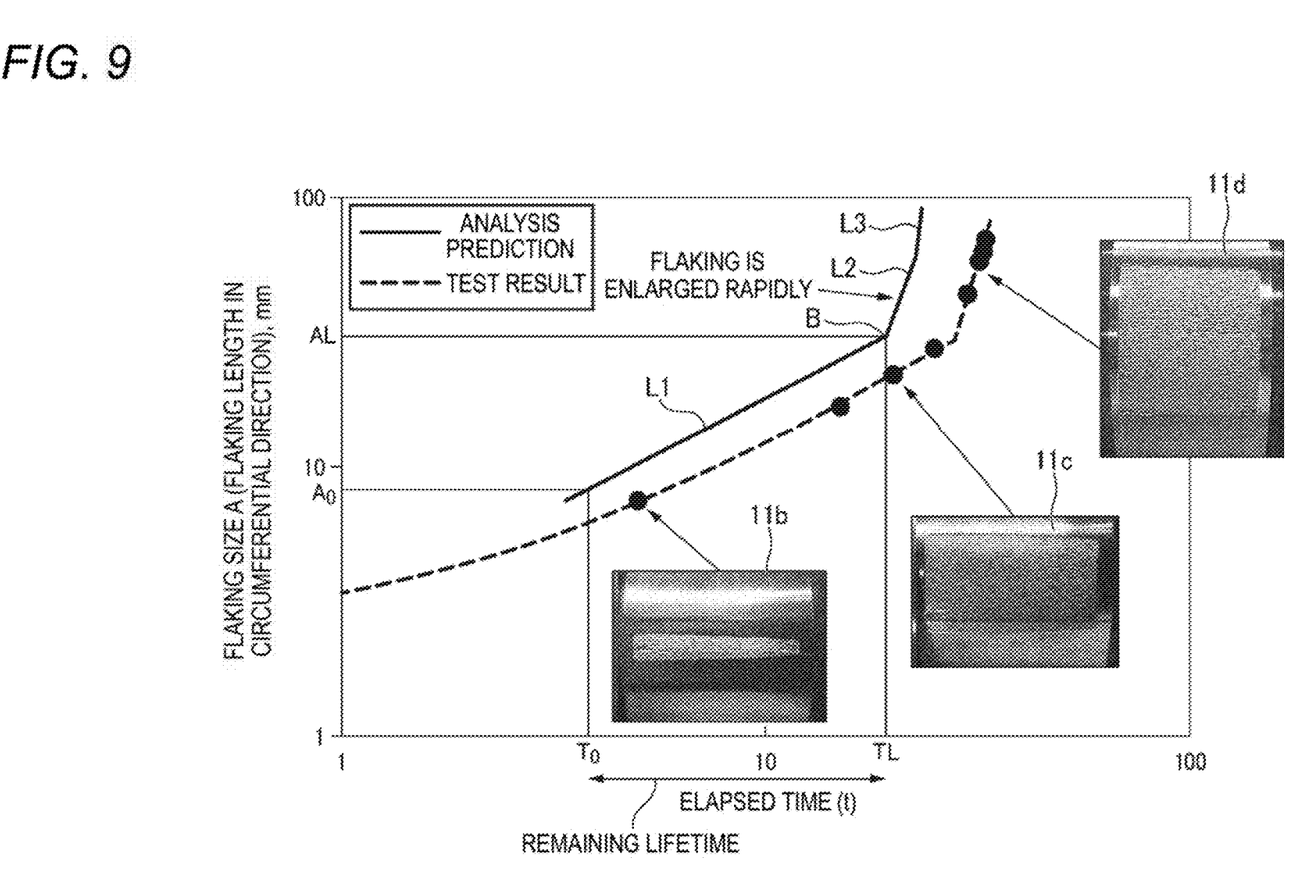
FIG. 9 is a graph showing a relationship between an elapsed time and a size of the flaked portion by comparing an analysis result and a test result according to the present embodiment.

Then, a relationship between a working time and a flaking size A is calculated based on theoretical calculation using the following equation by applying the bearing specifications such as the number of rolling elements 13 and the working conditions such as the rotational speed to the obtained crack development amount da/dN per cycle of stress, and a graph shown in FIG. 9 is created.

$$A = A_0 + da/dN \times n$$

$A_0$: a circumferential length of the flaked portion at the time point of observation n: the number of times the rolling element loads the exit portion of the flaked portion in the load zone As described with reference to FIG. 7, since the rolling element load F increases stepwise each time the circumferential length A of the flaked portion 15 is a multiple of the distance d between the rolling element pitches (each time the number of rolling elements which receive a load correctly among the rolling elements 13 existing in the load zone $Q_{area}$ decreases by one), the flaking development speed V also increases each time the circumferential length A of the flaked portion 15 is a multiple of the distance d between the rolling element pitches. A change in the flaking development speed V for each distance d between the rolling element pitches appears as a bending point B in FIG. 9.

Specifically, in a case that the circumferential length A of the flaked portion 15 is less than the distance d between the rolling element pitches, the length A of the flaked portion linearly increases along a straight line L1 in FIG. 9 (double logarithmic graph). Further, in a case that the circumferential length A of the flaked portion 15 reaches the distance d between the rolling element pitches, the circumferential length A of the flaked portion 15 linearly increases along a straight line L2 having a gradient larger than that of the straight line L1 (the flaking development speed V is faster). An intersection point of the straight line L1 and the straight line L2 is the bending point B when the circumferential length A of the flaked portion 15 reaches the distance d between the rolling element pitches. Then, when the bending point B is exceeded, the flaking development speed V rapidly changes (increases).

FIG. 9 shows a comparison between the flaking development analysis result obtained according to the flowchart of FIG. 3 and a test result of the flaking development test in which the relationship between the working time and the flaking size is investigated. As can be seen from FIG. 9, the analysis result and the test result show an approximate tendency, and it can be seen that the remaining lifetime of the rolling bearing 10 can be accurately predicted by the flaking development analysis method of the present embodiment.

A usable time of the rolling bearing 10 after the occurrence of the initial flaking, that is, the remaining lifetime, is different for each user for being determined by an allowable degree of a failure (for example, sound or vibration) occurring thereafter. Therefore, it is important to know in advance the relationship between the elapsed time and the flaking shape in order to appropriately manage the rolling bearing 10.

Next, based on FIG. 9, a circumferential length AL of the flaked portion with which the rolling bearing 10 can be used is specified to calculate an elapsed time TL since $T_0$ from when the circumferential length of the flaked portion 15 at the time point of observation is $A_0$ to when the flaked portion 15 reaches the specified shape (the circumferential length AL of the flaked portion 15), and the remaining lifetime (that is, $TL-T_0$) of the rolling bearing 10 is calculated (step S15).

Thus, it is preferable to obtain the remaining lifetime based on a remaining time before the bending point B at which the flaking development speed V rapidly increases is reached, because unexpected failure occurrence due to the rapid flaking development can be prevented. The specified circumferential length AL of the flaked portion 15 is not limited to before and after the distance d between the rolling element pitches, and may be set to a value exceeding (for example, twice or three times) the distance d between the rolling element pitches as long as the rolling bearing 10 is in a usable state.

In the procedure of the flowchart of FIG. 4 described above, a lifetime of the bearing before an assumed maximum length of the flaked portion is reached may be calculated in advance with respect to a predetermined working condition for each specification of each rolling bearing, and data of the calculation result may be tabulated and stored in the storage unit 33.

In this way, by an analysis in consideration of an increase in the rolling element load F caused by an increase in the circumferential length A of the flaked portion 15, a rapid increase of the flaking development and a rapid increase period of the flaking (a period at which the circumferential length A of the flaked portion 15 is a multiple of the distance d between the rolling element pitches) can be accurately predicted. Accordingly, preparation such as preliminary arrangement of replacement of the rolling bearing 10 can be efficiently performed.

The present invention is not limited to the embodiment described above, and modifications, improvements, and the like can be made as appropriate.

Figure 10A:
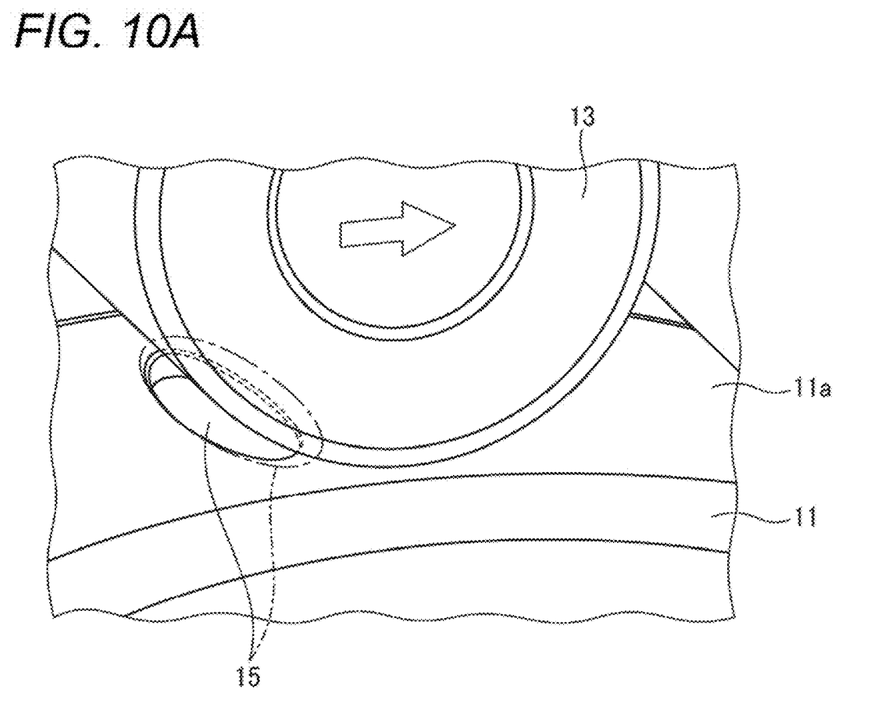
FIG. 10A is a perspective view showing a state in which a rolling element passes through an initial flaked portion on an inner ring of a cylindrical roller bearing.

For example, in the above-described embodiment, the fluctuation of the stress based on the FEM analysis is calculated two-dimensionally, but may be calculated three-dimensionally. In this case, a shape of the initial flaked portion 15 generated on the raceway surface 11a of the inner ring 11 is an oval shape elongated in an axial direction as shown in FIG. 10A, and even when the development of the flaking is not approximated as a change in the circumferential length A as in the above-described embodiment, fluctuation of the stress can also be calculated.

Figure 10B:
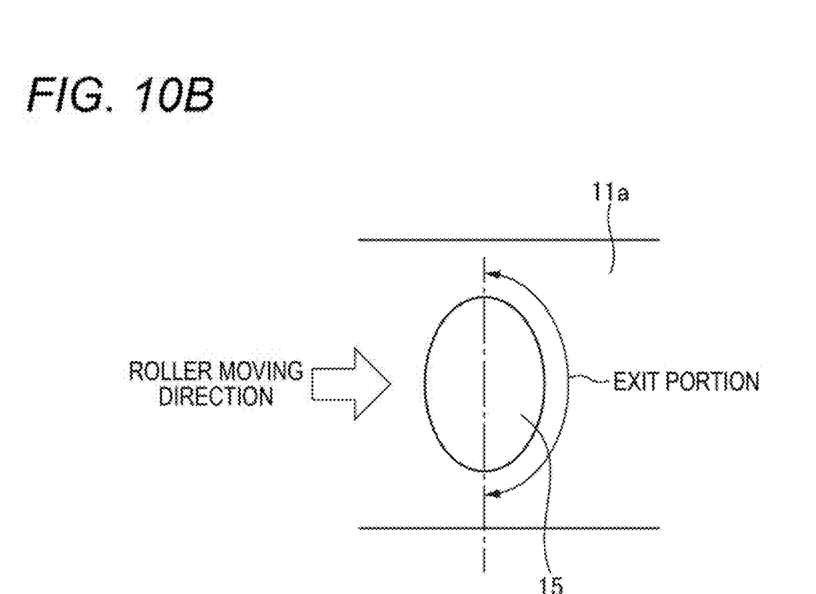
FIG. 10B is a top view of the inner ring illustrating an exit portion of the flaked portion when a finite element analysis is performed three-dimensionally.

Here, when the fluctuation of the stress is calculated three-dimensionally, as shown in FIG. 10B, an exit portion of the initial flaked portion 15 is shifted in the passing direction of the rolling element from a central position in the circumferential direction of the flaked portion 15.

In this case, since the load is not received when the rolling element 13 is positioned in the flaked portion 15, the rolling element load F also increases stepwise each time the circumferential length of the flaked portion 15 is a multiple of the distance d between the rolling element pitches, and a point where the flaking development speed changes rapidly is also the same as the above-described embodiment.

As described above, the following matters are disclosed in the present specification.

(1) A flaking development analysis method for predicting development of flaking of a raceway ring of a rolling bearing which is to be used in a rotation machine and includes inner and outer raceway rings and rolling elements between the two raceway rings, comprises the steps of:

acquiring presence or absence and a shape of flaking of the raceway ring by a flaking state acquisition unit;

calculating, based on at least the acquired shape of the flaked portion, a specification of the rolling bearing, and a working condition of the rolling bearing, a rolling element load acting on a rolling element when the rolling element passes through an exit portion of the flaked portion of the raceway ring taking a shape of the in-progress flaked portion into consideration;

calculating, based on the rolling element load at the exit portion of the flaked portion, a development speed of the flaking in which a shape of the in-progress flaked portion is taken into consideration; and calculating a relationship between an elapsed time and a shape of the flaked portion based on the development speed of the flaking.

According to the configuration, since the development speed of the flaking is calculated in consideration of the shape of the in-progress flaked portion based on the rolling element load when the rolling element passes through the exit portion of the flaked portion after occurrence of the initial flaking, a relationship between the elapsed time of the rolling bearing and the shape of the flaked portion can be accurately predicted.

(2) In the flaking development analysis method for a raceway ring of a rolling bearing described in the above (1), the shape of the flaked portion is a circumferential length of the flaked portion, and the step of calculating the rolling element load at the exit portion of the flaked portion is given by calculating a balance of force corresponding to the circumferential length of the flaked portion.

According to the configuration, since the rolling element load at the exit portion of the flaked portion is calculated according to the circumferential length of the flaked portion, the relationship between the elapsed time of the rolling bearing and the shape of the flaked portion can be accurately predicted.

(3) In the flaking development analysis method for a raceway ring of a rolling bearing described in the above (2), the step of calculating the development speed of the flaking is given by a crack development speed in which fluctuation in stress at the exit portion of the flaked portion obtained by a finite element analysis using the rolling element load at the exit portion of the flaked portion is set to a stress intensity factor range.

According to the configuration, the development speed of the flaking can be analyzed based on the Paris's law.

(4) The flaking development analysis method for a raceway ring of a rolling bearing described in any one of the above (1) to (3), further includes a step of outputting, as a remaining lifetime, a remaining time until a shape of the flaked portion specified in advance is obtained.

According to the configuration, the remaining lifetime of the rolling bearing can be accurately predicted.

(5) A flaking development analysis device for predicting development of flaking of a raceway ring of a rolling bearing which is to be used in a rotation machine and includes inner and outer raceway rings and rolling elements between the two raceway rings, comprises:

a flaking state acquisition unit configured to acquire presence or absence and a shape of flaking of the raceway ring; and an arithmetic unit configured to:
  calculate, based on at least the acquired shape of the flaked portion, a specification of the rolling bearing, and a working condition of the rolling bearing, a rolling element load acting on a rolling element when the rolling element passes through an exit portion of the flaked portion of the raceway ring taking a shape of the in-progress flaked portion into consideration,
  calculate, based on the rolling element load at the exit portion of the flaked portion, a development speed of the flaking in which a shape of the in-progress flaked portion is taken into consideration, and
  calculate a relationship between an elapsed time and a shape of the flaked portion based on the development speed of the flaking.

According to the configuration, the relationship between the working elapsed time of the rolling bearing and the shape of the flaked portion can be accurately predicted.

(6) In the flaking development analysis device for a raceway ring of a rolling bearing described in the above (5), the relationship between the elapsed time and the shape of the flaked portion is stored in advance in a storage unit according to a specification of the rolling bearing.

According to the configuration, an arithmetic time of the flaking development analysis can be shortened by using the relationship between the elapsed time and the shape of the flaked portion which is stored in the storage unit.

Although the embodiments are described above with reference to the drawings, it is needless to say that the present invention is not limited to such examples. It will be apparent to those skilled in the art that various changes and modifications may be conceived within the scope of the claims. It is also understood that the various changes and modifications belong to the technical scope of the present invention. Constituent elements in the embodiments described above may be combined freely within a range not departing from the spirit of the present invention.

The present application is based on Japanese Patent Application No. 2019-027618 filed on Feb. 19, 2019, the contents of which are incorporated herein by reference.

REFERENCE SIGNS LIST

1: flaking development analysis device
10: rolling bearing
11: inner ring (raceway ring)
12: outer ring (raceway ring)
13: cylindrical roller (rolling element)
15: flaked portion
15a: crack at exit portion of flaked portion
20: rotation machine (mechanical equipment)
21: flaking state acquisition unit
31: arithmetic processing unit
33: storage unit
A: circumferential length of flaked portion
$F$, $F_0$, $F_1$: rolling element load
K: stress intensity factor
t: working elapsed time
V: flaking development speed (crack development speed)
$\Delta K$: stress intensity factor range

The invention claimed is:

1. A flaking development analysis method for a raceway ring of a rolling bearing for predicting development of flaking of a raceway ring of a rolling bearing which is to be used in a rotation machine and includes inner and outer raceway rings and rolling elements between the two raceway rings, comprising the steps of:
  acquiring presence or absence and a shape of flaking of the raceway ring by a flaking state acquisition unit;
  calculating, based on at least the acquired shape of the flaked portion, a specification of the rolling bearing, and a working condition of the rolling bearing, a rolling element load acting on a rolling element when the rolling element passes through an exit portion of the flaked portion of the raceway ring taking a shape of the in-progress flaked portion into consideration;
  calculating, based on the rolling element load at the exit portion of the flaked portion, a development speed of the flaking in which a shape of the in-progress flaked portion is taken into consideration; and
  calculating a relationship between an elapsed time and a shape of the flaked portion based on the development speed of the flaking.

2. The flaking development analysis method for a raceway ring of a rolling bearing according to claim 1, wherein
  the shape of the flaked portion is a circumferential length of the flaked portion, and
  the step of calculating the rolling element load at the exit portion of the flaked portion is given by calculating a balance of force corresponding to the circumferential length of the flaked portion.

3. The flaking development analysis method for a raceway ring of a rolling bearing according to claim 2, wherein
  the step of calculating the development speed of the flaking is given by a crack development speed in which fluctuation in stress at the exit portion of the flaked portion obtained by a finite element analysis using the rolling element load at the exit portion of the flaked portion is set to a stress intensity factor range.

4. The flaking development analysis method for a raceway ring of a rolling bearing according to claim 1, further comprising:
  a step of outputting, as a remaining lifetime, a remaining time until a shape of the flaked portion specified in advance is obtained.

5. A flaking development analysis device for a raceway ring of a rolling bearing for predicting development of flaking of a raceway ring of a rolling bearing which is to be used in a rotation machine and includes inner and outer raceway rings and rolling elements between the two raceway rings, comprising:
  a flaking state acquisition unit configured to acquire presence or absence and a shape of flaking of the raceway ring; and
  an arithmetic unit configured to:
    calculate, based on at least the acquired shape of the flaked portion, a specification of the rolling bearing, and a working condition of the rolling bearing, a rolling element load acting on a rolling element when the rolling element passes through an exit portion of the flaked portion of the raceway ring taking a shape of the in-progress flaked portion into consideration,
    calculate, based on the rolling element load at the exit portion of the flaked portion, a development speed of the flaking in which a shape of the in-progress flaked portion is taken into consideration, and
    calculate a relationship between an elapsed time and a shape of the flaked portion based on the development speed of the flaking.

6. The flaking development analysis device for a raceway ring of a rolling bearing according to claim 5, wherein the relationship between the elapsed time and the shape of the flaked portion is stored in advance in a storage unit according to a specification of the rolling bearing.

\* \* \* \* \*